US012093256B2

(12) United States Patent
Lin et al.

(10) Patent No.: US 12,093,256 B2
(45) Date of Patent: Sep. 17, 2024

(54) METHODS FOR SEARCH RESULT PRESENTATION AND FOR SEARCH REQUEST PROCESSING AND COMPUTER DEVICE

(71) Applicant: Beijing Bytedance Network Technology Co., Ltd., Beijing (CN)

(72) Inventors: Yating Lin, Beijing (CN); Yujie Wu, Beijing (CN); Mulan Hou, Beijing (CN); Qingqing Liu, Beijing (CN); Junpeng Li, Beijing (CN); Junxin Wu, Beijing (CN); Xin Yu, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/525,511

(22) Filed: Nov. 30, 2023

(65) Prior Publication Data
US 2024/0104130 A1 Mar. 28, 2024

Related U.S. Application Data

(63) Continuation of application No. PCT/CN2022/139322, filed on Dec. 15, 2022.

(30) Foreign Application Priority Data

Jan. 12, 2022 (CN) .......................... 202210033804.6

(51) Int. Cl.
G06F 16/00 (2019.01)
G06F 16/2453 (2019.01)
(Continued)

(52) U.S. Cl.
CPC ...... *G06F 16/24542* (2019.01); *G06F 16/248* (2019.01); *G06F 16/90332* (2019.01);
(Continued)

(58) Field of Classification Search
CPC ........... G06F 16/4393; G06F 16/24556; G06F 16/24542; G06F 16/90332; G06F 16/24565; G06F 16/248
(Continued)

(56) References Cited

U.S. PATENT DOCUMENTS

| 2016/0170989 A1 | 6/2016 | Bishop et al. |
| 2016/0180437 A1 | 6/2016 | Boston et al. |

(Continued)

FOREIGN PATENT DOCUMENTS

| CN | 104636465 A | 5/2015 |
| CN | 104881447 A | 9/2015 |

(Continued)

OTHER PUBLICATIONS

International Search Report and Written Opinion, International Patent Application No. PCT/CN2022/139322, Feb. 21, 2023 with English translation of Search Report (9 pages).

(Continued)

*Primary Examiner* — Michelle N Owyang
(74) *Attorney, Agent, or Firm* — HSML P.C.

(57) ABSTRACT

The disclosure provides methods and apparatuses, electronic device, storage medium, computer program product and computer program for search result presentation and for search request processing. The method for search result presentation includes: in response to a trigger operation, initiating a search request for a target question, the target question corresponding to a plurality of answers; acquiring a plurality of pieces of structured information characterizing the respective answers, wherein the structured information is obtained by extracting from search results that support the respective answers and aggregating according to a target aggregation approach corresponding to an attribute feature of the target question, the search results are multimedia (Continued)

contents recalled on the basis of the target question, and each piece of structured information comprises an argument and/or a premise of an answer and core content of the answer; and presenting the plurality of pieces of the structured information on a search result page.

15 Claims, 5 Drawing Sheets

(51) Int. Cl.
*G06F 16/248* (2019.01)
*G06F 16/9032* (2019.01)
*G06F 16/9538* (2019.01)
*G06F 16/2455* (2019.01)
*G06F 16/438* (2019.01)

(52) U.S. Cl.
CPC .... *G06F 16/9538* (2019.01); *G06F 16/24556* (2019.01); *G06F 16/24565* (2019.01); *G06F 16/4393* (2019.01)

(58) Field of Classification Search
USPC .................................................. 707/600–899
See application file for complete search history.

(56) References Cited

U.S. PATENT DOCUMENTS

| | | | | |
|---|---|---|---|---|
| 2017/0154626 A1* | 6/2017 | Kim | ........................ | G10L 15/22 |
| 2018/0181673 A1* | 6/2018 | Liu | ........................ | G06F 16/243 |
| 2018/0181677 A1* | 6/2018 | Wei | ........................ | G06F 16/9535 |
| 2019/0163714 A1* | 5/2019 | Ma | ........................ | G06F 16/2465 |
| 2021/0216576 A1* | 7/2021 | Staub | ................. | G06Q 30/0282 |
| 2022/0391586 A1* | 12/2022 | Matsuzawa | ......... | G06F 16/3329 |

FOREIGN PATENT DOCUMENTS

| | | |
|---|---|---|
| CN | 10829317 A | 7/2018 |
| CN | 109063221 A | 12/2018 |
| CN | 109063215 B | 10/2020 |
| CN | 111859195 A | 10/2020 |
| CN | 112084268 A | 12/2020 |
| CN | 113392308 A | 9/2021 |
| CN | 113900764 A | 1/2022 |
| CN | 114372215 A | 4/2022 |
| CN | 115098724 A | 9/2022 |

OTHER PUBLICATIONS

Office Action issued in Chinese Patent Application No. 202210033804.6, Mar. 30, 2023, with machine translation (20 pages).
Extended European Search Report issued in European Patent Application No. 22920017.5, Jul. 18, 2024 (7 pages).

* cited by examiner

METHODS FOR SEARCH RESULT PRESENTATION AND FOR SEARCH REQUEST PROCESSING AND COMPUTER DEVICE

CROSS REFERENCE

This application is a continuation of International Patent Application No. PCT/CN2022/139322, filed on Dec. 15, 2022, which claims the benefit of CN Patent Application No. 202210033804.6 filed on Jan. 12, 2022, and entitled "Methods and Apparatuses for Search Result Presentation and for Search Request Processing", both of which are incorporated herein by reference in their entireties.

FIELD

The present disclosure relates to the field of Internet technologies, in particular to methods and apparatuses, electronic device, storage medium, computer program product and computer program for search result presentation and for search request processing.

BACKGROUND

When a user queries a question, the corresponding search results are usually sorted according to the number of visitors, the correlation with search terms, etc. If one question corresponds to a plurality of answers, each search result can only present one or more of the answers. If the user wants to view all the answers, he/she can only click into the search results one by one to view, and such an operation process is relatively complicated.

SUMMARY

Embodiments of the present disclosure at least provide methods and apparatuses for search result presentation and for search request processing.

In a first aspect, an embodiment of the present disclosure provides a method for search result presentation. The method includes:
    in response to a trigger operation, initiating a search request for a target question, the target question corresponding to a plurality of answers;
    acquiring a plurality of pieces of structured information characterizing the respective answers, wherein the structured information is obtained by extracting from search results that support the respective answers and aggregating according to a target aggregation approach corresponding to an attribute feature of the target question, the search results are multimedia contents recalled on the basis of the target question, and each piece of structured information comprises an argument and/or a premise of an answer and core content of the answer; and
    presenting the plurality of pieces of the structured information on a search result page.

In one optional implementation, the structured information is obtained by extracting initial structured information from the search results and then aggregating the initial structured information according to the target aggregation approach corresponding to the attribute feature of the target question,
    wherein after a plurality of candidate search results is determined based on the search request, the search results are filtered based on preset authority scores of the plurality of candidate search results and the degree of relevance between the plurality of candidate search results and the target question.

In one optional implementation, the attribute feature of the target question comprises a first type in which the answer is related to the premise or a second type in which the answer is not related to the premise;
    in the case where the attribute feature of the target question is of the first type, each piece of the structured information at least includes core content and premise of the answer; and
    in the case where the attribute feature of the target question is of the second type, each piece of the structured information at least includes core content and argument of the answer.

In one optional implementation, the initial structured information is extracted from the search results based on a pre-trained structured information extraction model; and
    the aggregating the initial structured information according to the target aggregation approach corresponding to the attribute feature of the target question comprises:
    in the case where the attribute feature of the target question is of the first type, aggregating the initial structured information based on the premise in the structured information; and
    in the case where the attribute feature of the target question is of the second type, aggregating the initial structured information based on the core content in the structured information.

In one optional implementation, the presenting the plurality of pieces of the structured information on the search result page comprises:
    constructing answer information corresponding to the structured information to answer the target question, based on each piece of the structured information; and
    presenting answer information for the plurality of pieces of the structured information side by side on the search result page.

In one optional implementation, the presenting answer information for the plurality of the structured information on the search result page comprises:
    presenting the plurality of pieces of the structured information on the search result page, and search results corresponding to the structured information.

In one optional implementation, the presenting the plurality of pieces of the structured information on the search result page and search results corresponding to the structured information comprises:
    presenting the core content of the answer in the plurality of pieces of the structured information on the search result page, and presenting a content card of the selected core content, the content card presenting a part of the multimedia content of the search results, the content card supporting a sliding presentation.

In a second aspect, an embodiment of the present disclosure further provides a method for search request processing. The method includes:
    receiving a search request carrying a target question sent from a client, the target question corresponding to a plurality of answers;
    determining a search result corresponding to the search request, and determining an attribute feature of the target question;
    for each search result, after extracting initial structured information from the search result, aggregating the initial structured information based on a target aggregation approach corresponding to the attribute feature of the target question, and determining a plurality of pieces of structured information, wherein each piece of the structured information comprises an argument and/or a premise of an answer and core content of the answer; and sending the plurality of pieces of structured information to the client so as to present the structured information through the client.

In a third aspect, an embodiment of the present disclosure further provides an apparatus for search result presentation. The apparatus includes:

a responding module configured to in response to a trigger operation, initiate a search request for a target question, the target question corresponding to a plurality of answers;

an acquiring module configured to acquire a plurality of pieces of structured information that characterizing the respective answers, wherein the structured information is obtained by extracting from search results that support the respective answers and aggregating according to a target aggregation approach corresponding to an attribute feature of the target question, the search results are multimedia contents recalled on the basis of the target question, and each piece of the structured information comprises an argument and/or a premise of an answer and core content of the answer; and a presenting module configured to present the plurality of pieces of the structured information on a search result page.

In one optional implementation, the structured information is obtained by extracting initial structured information from the search results and then aggregating the initial structured information according to the target aggregation approach corresponding to the attribute feature of the target question, wherein after a plurality of candidate search results is determined based on the search request, the search results are filtered based on preset authority scores of the plurality of candidate search results and the degree of relevance between the plurality of candidate search results and the target question.

In one optional implementation, the attribute feature of the target question comprises a first type in which the answer is related to the premise or a second type in which the answer is not related to the premise;

in the case where the attribute feature of the target question is of the first type, each piece of the structured information at least includes core content and premise of the answer; and in the case where the attribute feature of the target question is of the second type, each piece of the structured information at least includes core content and argument of the answer.

In one optional implementation, the initial structured information is extracted from the search results based on a pre-trained structured information extraction model; and the aggregating the initial structured information according to the target aggregation approach corresponding to the attribute feature of the target question comprises:

in the case where the attribute feature of the target question is of the first type, aggregating the initial structured information based on the premise in the structured information; and in the case where the attribute feature of the target question is of the second type, aggregating the initial structured information based on the core content in the structured information.

In one optional implementation, the presenting module presents the plurality of pieces of the structured information on the search result page comprises:

constructing answer information corresponding to the structured information to answer the target question, based on each piece of the structured information; and presenting answer information for the plurality of pieces of the structured information side by side on the search result page.

In one optional implementation, the presenting module presents answer information for the plurality of the structured information on the search result page comprises:

presenting the plurality of pieces of the structured information on the search result page, and search results corresponding to the structured information.

In one optional implementation, the presenting module presents the plurality of pieces of the structured information on the search result page and search results corresponding to the structured information comprises:

presenting the core content of the answer in the plurality of pieces of the structured information on the search result page, and presenting a content card of the selected core content, the content card presenting a part of the multimedia content of the search results, the content card supporting a sliding presentation.

In a fourth aspect, an embodiment of the present disclosure further provides an apparatus for search request processing. The apparatus includes:

a receiving module configured to receive a search request carrying a target question sent from a client, the target question corresponding to a plurality of answers;

a first determining module configured to determine a search result corresponding to the search request and determine an attribute feature of the target question;

a second determining module configured to, for each search result, after extracting initial structured information from the search result, aggregate the initial structured information based on a target aggregation approach corresponding to the attribute feature of the target question, and determine a plurality of pieces of structured information, wherein each piece of the structured information an argument and/or a premise of an answer and core content of the answer; and a sending module configured to send the plurality of pieces of structured information to the client so as to present the structured information through the client.

In a fifth aspect, an embodiment of the present disclosure further provides a computer device. The computer device includes: a processor, a memory and a bus, wherein the memory is configured to store machine-readable instructions that can be executed by the processor; and when the computer device is running, the processor communicates with the memory through the bus, and the machine-readable instructions are executed by the processor to perform the steps in the first aspect, or any possible implementation manner in the first aspect.

In a sixth aspect, an embodiment of the present disclosure further provides a computer readable storage medium, wherein the computer readable storage medium is configured to store a computer program that is run by a processor to perform the steps in the first aspect, or any possible implementation manner in the first aspect, or to perform the second aspect.

In a seventh aspect, an embodiment of the present disclosure further provides a computer program product, wherein the computer product carries program codes that comprise instructions that can be used to perform the steps in the first aspect, or any possible implementation manner in the first aspect, or to perform the second aspect.

In an eighth aspect, an embodiment of the present disclosure further provides a computer program, wherein the computer program is executed by a processor to perform the steps in the first aspect, or any possible implementation manner in the first aspect, or to perform the second aspect.

In order to make the above purposes, features and advantages of the present disclosure more obvious and understandable, preferred embodiments are given below and detailed with the accompanying drawings.

BRIEF DESCRIPTION OF THE DRAWINGS

In order to more clearly illustrate the technical solutions of the embodiments of the present disclosure, the drawings required to be used in the embodiments will be introduced simply. The drawings herein are incorporated into the description and constitute a part of the description. These drawings show embodiments that conform to the embodiments of the present disclosure and are used together with the description to illustrate the technical solutions of the present disclosure. It would be appreciated that the following drawings show only certain embodiments of the present disclosure, and therefore should not be regarded to limit the scope. A person of ordinary skill in the art may derive other relevant drawings from these drawings without creative efforts.

DETAILED DESCRIPTION

Figure 1:
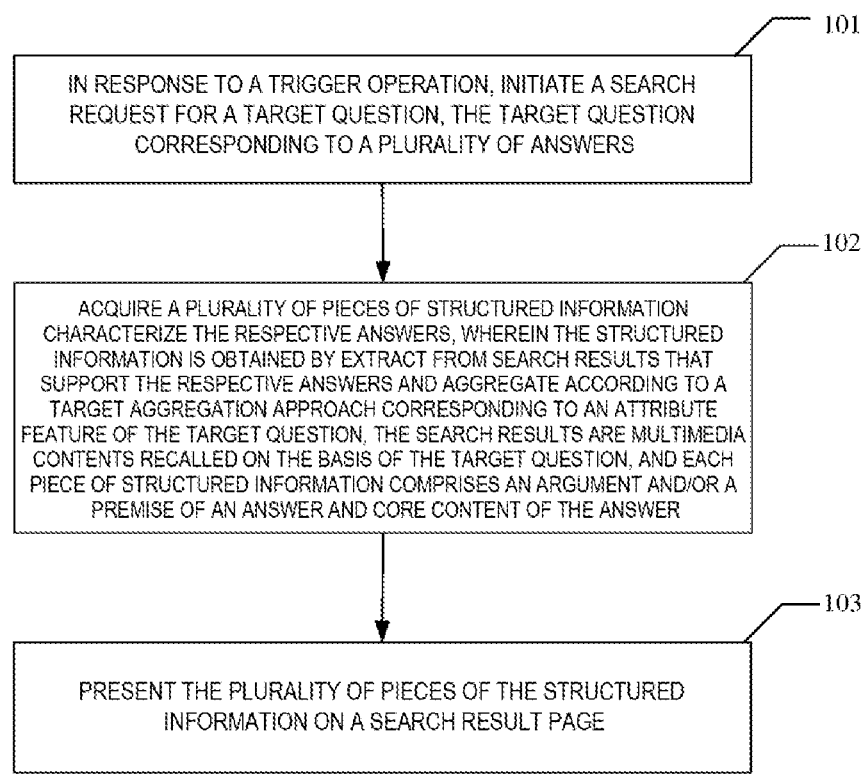
FIG. 1 illustrates a flowchart of a method for search result presentation provided by an embodiment of the present disclosure.

In order to make the objectives, technical solutions and advantages of the embodiments of the present disclosure more clearly, the technical solutions in the embodiments of the present disclosure will be described clearly and completely below in conjunction with the drawings in the embodiments of the present disclosure. Obviously, the described embodiments are merely some embodiments, rather than all the embodiments. In general, the components in the embodiments of the present disclosure described and shown in the drawings herein can be arranged and designed in a variety of different configurations. Accordingly, the following detailed description of the embodiments of the present disclosure provided in the drawings is not intended to limit the scope of the present disclosure claimed for protection, but rather represents only selected embodiments of the present disclosure. Based on the embodiments of the present disclosure, all other embodiments obtained by those skilled in the art without creative efforts fall into the protection scope of the present disclosure.

It is found through search that in related technologies, when a user queries a question, the corresponding search results are usually sorted according to the number of visitors, the correlation with search terms, etc. If one question corresponds to a plurality of answers, each search result can only present one or more of the answers. If the user wants to view all the answers, he/she can only click into the search results one by one to view, and such an operation process is relatively complicated.

Based on the above research, the present disclosure provides a method for search result presentation that may respond to a trigger operation and initiate a search request for a target question. The target question corresponds to a plurality of answers, acquires a plurality of pieces of structured information that characterizing the respective answers, and presents a plurality of pieces of the structured information on a search result page, wherein the structured information is obtained by extracting from search results that support the respective answers and aggregating according to a target aggregation approach corresponding to an attribute feature of the target question. With respect to the questions raised by users, this method may be adopted to aggregate the obtained search results and present to the users a plurality of pieces of aggregated structured information, which can thereby present to the users a plurality of answers at the same time, and further in turn help users get effective information quickly.

It should be noted that similar numerals and alphabets represent similar items in the drawings below, so that once an item is defined in one of the drawings, it does not need to be further defined and explained in subsequent drawings.

In order to facilitate the understanding of this embodiment, a method for search result presentation disclosed in an embodiment of the present disclosure is firstly introduced in details. An execution subject of the method for search result presentation provided in the embodiment of the present disclosure is generally a terminal device, and the terminal device may be a smart phone, a tablet computer, a wearable device, etc. In some possible implementations, this method for search result presentation may be implemented by a processor calling computer readable instructions stored in a memory.

Referring to FIG. 1, a flowchart of a method for search result presentation provided by an embodiment of the present disclosure is illustrated. The method includes the following steps 101 to 103.

In 101, in response to a trigger operation, a search request for a target question is initiated, the target question corresponds to a plurality of answers.

In 102, a plurality of pieces of structured information characterizing the respective answers is acquired, wherein the structured information is obtained by extracting from search results that support the respective answers and aggregating according to a target aggregation approach corresponding to an attribute feature of the target question, the search results are multimedia contents recalled on the basis of the target question, and each piece of the structured information includes an argument and/or a premise of an answer, and core content of the answer.

In 103, the plurality of pieces of the structured information is presented on a search result page.

The steps 101 to 103 are detailed as follows.

With respect to 101:

the trigger operation, for example, may be a click operation, a sliding operation, etc. Exemplarily, the search request for initiating a target question in response to the trigger operation may be a search request that initiates the target question in response to a search button being triggered after the target question entered by the user in a search box is received (for example, the search request may carry the target question).

The target question may be presented in the form of questions, such as "What can't be eaten for hyperchlorhydria?", "How long is it best to cook Zongzi?", etc.

The target question corresponds to a plurality of answers, and the answer may be extracted from the search results corresponding to the search request for an intuitive answer to the target question. In specific implementation, after receiving the search request, the server may determine a plurality of search results corresponding to the search request. The answer in different search results may be different, and the expression of the same answer in different search results may also be different.

Exemplarily, the target question may be "How long is it best to cook Zongzi?", and the corresponding answer may be "Zongzi can be fully cooked in 30 minutes", "The cooking time cannot exceed 15 minutes when cooking Zongzi", "It is best to cook Zongzi for half an hour", or the like.

With respect to 102:

in a possible implementation, the structured information is obtained by extracting initial structured information from the search results and then aggregating the initial structured information according to the target aggregation approach corresponding to the attribute feature of the target question.

After a plurality of candidate search results is determined based on the search request, the search results are filtered based on preset authority scores of the plurality of candidate search results and the degree of relevance between the plurality of candidate search results and the target question.

Specifically, after receiving the search request, the server may determine a plurality of candidate search results based on the target question, wherein the candidate search results may be the search results recalled based on the target question and related to the target question. Since different candidate search results have different relevance to the target question, the candidate search results may not be of directivity and certainty. That is, there may be content with less relevance to the target problem in the candidate search results, or there may be wrong results.

Based on this, the search results may be filtered from the candidate search results based on the preset authority scores of the plurality of candidate search results and the degree of relevance between the candidate search results and the target question.

Exemplarily, a candidate search result whose preset authority score is higher than a preset score and/or whose relevance to the target question is higher than a preset relevance may be used as a filtered search result.

The attribute feature of the target question includes a first type in which the answer is related to the premise or a second type in which the answer is not related to the premise.

The premise refers to a premise condition of the answer in response to answering the target question. In the case that the target question is of the first type, the corresponding answers to the target question are different under different premises. For example, the corresponding premise of the target question "How long does it take to cook the Zongzi?" may include "The Zongzi is raw" or "The Zongzi is frozen". When the premise is "The Zongzi is raw", the corresponding answers to the target question may be 2 hours; and when the premise is "The Zongzi is frozen", the corresponding answers to the target question may be 30 minutes.

The argument is the basis for the answer to the target question. For example, the target question may be "What can't be eaten for hyperchlorhydria?" One of the corresponding answers may be "Wild jujube", and the corresponding argument may be "Wild jujube is an acidic food, so the wild jujube can't be eaten for hyperchlorhydria".

The first type is generally a scenario-priority type, which exemplarily may include "type of reason", "type of practical operation", "type of definition", and so on. The way of asking the target question of the answer-priority type is generally based on the premise, in the form of how to do or how to deal with such a question. The answer corresponding to the first type of target question generally presents the result as a specific event.

The second type is generally the answer-priority type, which may include "type of judgment", "type of number" and so on. The way of asking the target question of the answer-priority type is generally in the form of "Yes or No", "Right or Wrong", or "More or Less". The answer corresponding to the second type of the target question generally presents the result of a judgment.

In a possible implementation, in the case where the attribute feature of the target question is of the first type, each piece of the structured information at least includes core content and a premise of the answer.

Exemplarily, in the case where the attribute feature of the target question is of the first type, if the target question of the first type is "How long should the Zongzi be cooked?", one of the corresponding answers may be "If the Zongzi is raw, it takes two hours to cook", wherein "Raw Zongzi" is the premise, and the core content of the answer is "Two hours".

In the case where the attribute feature of the target question is of the second type, each piece of the structured information at least includes core content and argument of the answer.

Exemplarily, in the case where the attribute feature of the target question is of the second type, if the second type of target question is "Which five fruits can't be eaten for stomach problems?", one of the corresponding answers may be "Because cherry tomatoes are acidic food, so cherry tomatoes cannot be eaten for stomach problems", wherein "Cherry tomatoes are acidic food" is the argument, the core content of the answer is "Cherry tomatoes cannot be eaten for stomach problems".

In a possible implementation, the initial structured information is extracted from the search results based on a pre-trained structured information extraction model.

The structured information extraction model may be obtained by training based on a sample text and annotated data of the sample text. For example, the training process of the structured information extraction model may be supervised training, and the specific training process will not be repeated.

Specifically, in the case where the initial structured information is extracted by using the structured information extraction model, the structured information extraction model may determine a probability of each statement in the search result belonging to a variety of structured types, and then the statement whose corresponding probability exceeds a preset probability is taken as the corresponding structured information.

Exemplarily, if a probability of a statement in the search result being a premise is 10%, a probability of the statement being an argument is 80%, and a probability of the statement being core content of the answer is 10%, the statement is an argument in the search results.

In a possible implementation, the same search result may contain a plurality of answers, as well as the arguments and/or premises of a plurality of answers, and the argument and/or premises usually correspond to the answers. Therefore, the structured extraction model may extract a plurality of pieces of structured information from one search result, and the core content of the answers in the plurality of pieces of structured information belonging to one search result is different.

Exemplarily, the plurality of structured information extracted from one search result may be: {core content of the answer A—argument A—premise A}, and {core content of the answer B—argument B—premise B}.

A plurality of search results may be obtained after screening from the candidate search results. Therefore, through the structured information extraction model, it is possible to extract a plurality of initial structured information from a plurality of different search results.

Here, the plurality of pieces of extracted initial structured information may contain the same answer. Therefore, in order to present content to users accurately and concisely, the plurality of pieces of extracted initial structured information may be aggregated.

Exemplarily, when the initial structured information is aggregated according to the target aggregation approach corresponding to the attribute feature of the target question, in the case where the attribute feature of the target question is of the first type, the initial structured information may be aggregated based on the premise in the structured information; and in the case where the attribute feature of the target question is of the second type, the initial structured information may be aggregated based on the core content of the answer in the structured information.

Specifically, in the case where the attribute feature of the target question is of the first type, the answer to the target question is influenced by the premise, the answer should be the same under the same premise, and the answers may be different under different premises. Based on this, the initial structured information may be aggregated based on the premise in the structured information.

Specifically, based on the premise in the structured information, when the initial structured information is aggregated, each premise in the initial structured information may be aggregated based on an equivalence inclusion relationship to determine a plurality of premises after aggregation. For a certain premise after aggregation, a plurality of answers (and arguments) under this premise may be determined, and then the plurality of answers (and arguments) is aggregated based on the equivalence inclusion relationship.

Exemplarily, with respect to the premise of the target question "How long should the Zongzi be cooked?", if "Raw Zongzi" and "Freshly wrapped Zongzi" are of an equivalent relationship, they may be merged. In response to the merging, premises that are less relevant to the target question may be merged into premises that are more relevant to the target question.

In the case where the attribute feature of the target question is of the second type, the answer to the target question is less influenced by the premise, but the answer to the target question needs to be supported by argument, and the argument for the same answer may be different. Based on this, the initial structured information may be aggregated based on the core content of the answer in the structured information.

Specifically, based on the equivalence inclusion relationship, the core content of each answer in the initial structured information may be aggregated to determine the core content of a plurality of answers after aggregation. For the core content of an aggregated answer, a plurality of arguments for this answer may be determined, and then the argument are aggregated based on the equivalence inclusion relationship.

In practical application, after a plurality of pieces of initial structured information is extracted, the plurality of pieces of initial structured information and the attribute features of the target question may be inputted into a voting model, and the voting model may automatically perform a semantic understanding of the plurality of pieces of initial structured information and make a judgment on the equivalence inclusion relationship, so as to output the plurality of pieces of structured information after aggregation.

In a possible implementation, after a plurality of pieces of structured information that represents the respective answers is acquired, statements may be merged based on each piece of structured information to organize the structured information into a fragment that may be read directly, wherein the merged fragment may be presented in an abstract form or in short sentences.

Specifically, when the statements are merged based on the structured information, exemplarily, the structured information may be added to a preset statement template according to the preset statement template to form this fragment.

The statement templates corresponding to the target questions with different attribute features may be different. For example, the statement template corresponding to the target question of the first type may be "if XXXX (premise), then XXXX (the core content of the answer), because XXXX (argument which is optional)"; and the statement template corresponding to the target question of the second type may be "XXXX (the core content of the answer) because XXXX (argument)".

In this way, the merged fragments are allowed to be presented in response to presenting the structured information.

With respect to 103:
  in a possible implementation, in response to presenting a plurality of pieces of the structured information on a search result page, the plurality of pieces of the structured information and the search results corresponding to the structured information may be presented on the search results page.

Figure 2:
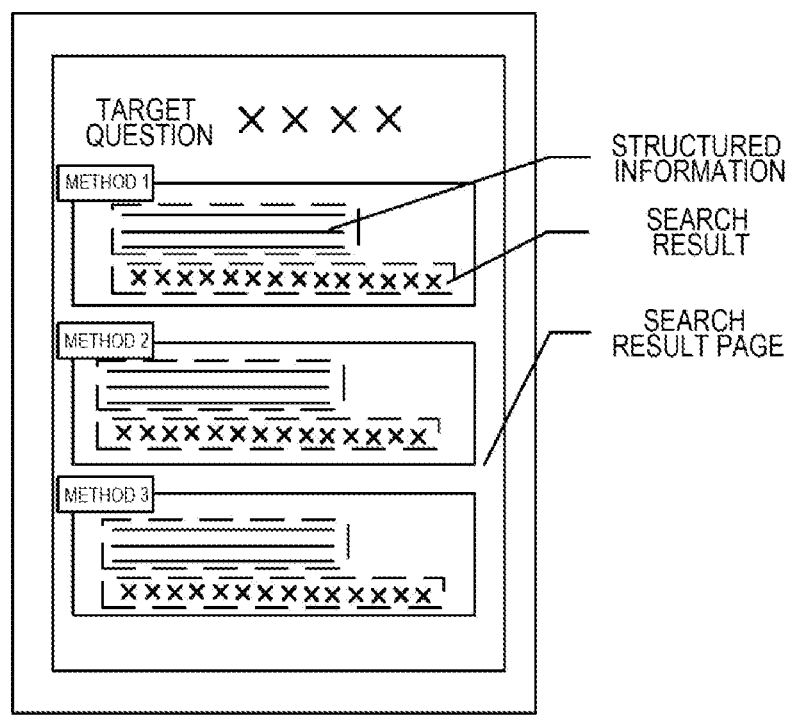
FIG. 2 illustrates a schematic diagram of presentation of a plurality of pieces of structured information in a method for search result presentation provided by an embodiment of the present disclosure.

Exemplarily, as shown in FIG. 2, a form of presentation of a plurality of pieces of the structured information is illustrated. The plurality of pieces of structured information may be presented on a target page side by side.

In the course of presenting the target question on the page, the target question may be highlighted by bolding or special effects. In the course of presenting the plurality of pieces of structured information side by side, the plurality of pieces of the structured information may be labeled separately, for example, labeled as "Method 1", "Method 2", and "Method 3", or separately identified by the numbers 1, 2, and 3. Then, different structured information is separately presented under such identifications.

In addition to the plurality of pieces of structured information, the search results for any structured information may also be presented side by side under the corresponding structured information to supplement the content of the corresponding structured information. Exemplarily, as shown in FIG. 2, when the user clicks on any structured information or on its corresponding search results, the page may jump to a detailed content page of the search results.

In a possible implementation, in the course of presenting the plurality of pieces of the structured information and the search results corresponding to the structured information on the search result page, the core content of the answers in the plurality of pieces of the structured information may also be presented on the search result page, and a content card of the selected core content is presented. The content card presents a part of multimedia content of the search results, and supports a sliding presentation.

Figure 3:
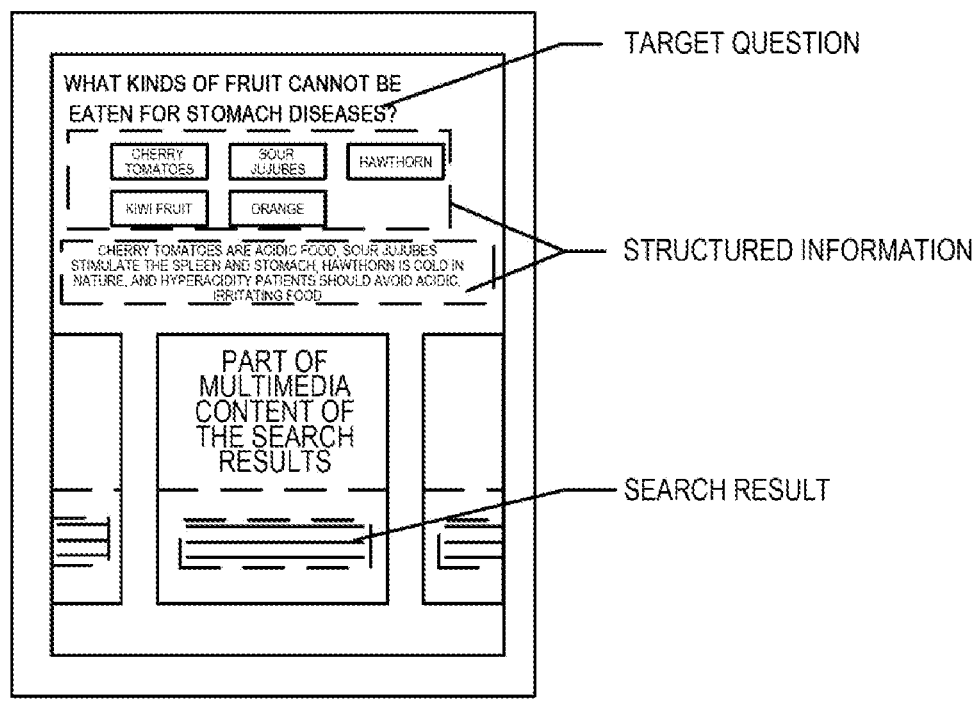
FIG. 3 illustrates another schematic diagram of presentation of a plurality of pieces of the structured information in a method for search result presentation provided by an embodiment of the present disclosure.

Exemplarily, as shown in FIG. 3, another form of presentation of a plurality of pieces of structured information is presented. The plurality of pieces of structured information after aggregation is presented side by side on the target page in the form of content cards. The fragments of the plurality of pieces of structured information are presented separately and side by side on the search result page. When the user clicks on the fragments of the presented structured information, the page presents a content card corresponding to the structured information.

Exemplarily, as shown in FIG. 3, when the target question is "What kinds of fruit cannot be eaten for stomach diseases?", "Cherry tomatoes", "Sour jujube", "Hawthorn", "Kiwi fruit" and "Orange" may be presented side by side under the target question. "Cherry tomatoes", "Sour jujube" and "Hawthorn" are a piece of structured information, and "Kiwi fruit" and "Orange" are another piece of structured information. When the user clicks on "Cherry tomatoes", the search result page presents a content card corresponding to "Cherry Tomatoes". Meanwhile, when the user clicks any of "Cherry tomatoes", "Sour Jujube" and "Hawthorn", the search result page may present a fragment "Cherry tomatoes is acidic food, sour jujubes stimulate the spleen and stomach, hawthorn is cold in nature, and hyperacidity patients should avoid acidic, irritating food" after the piece of structured information "Cherry tomatoes", "Sour Jujubes" and "Hawthorn" is merged.

Figure 4:
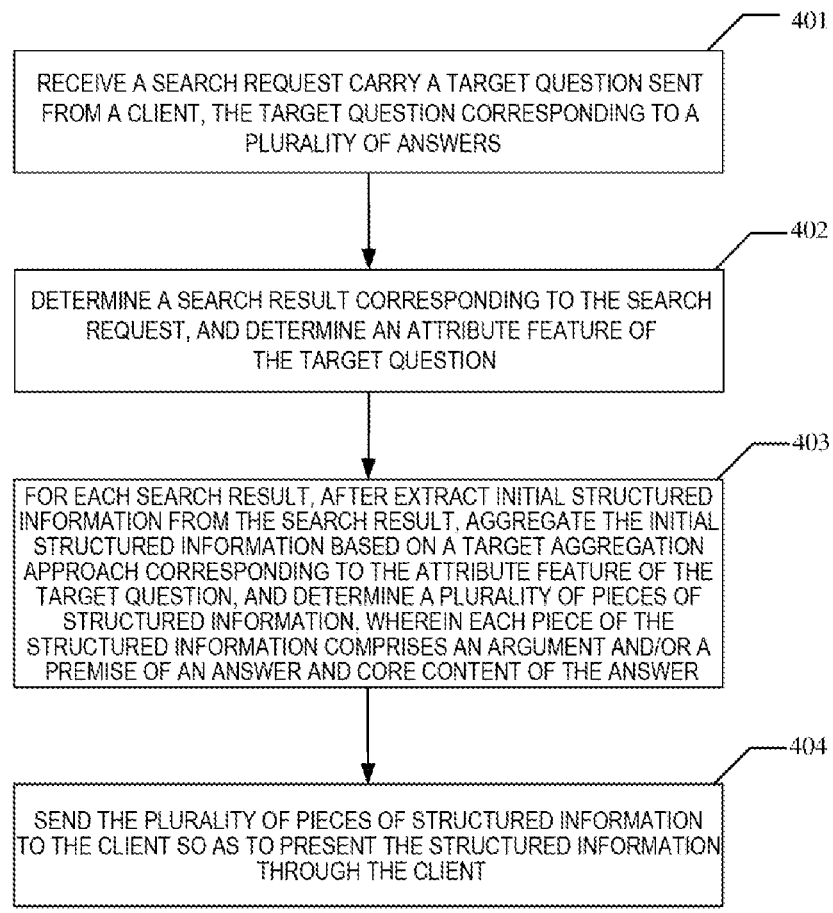
FIG. 4 illustrates a flowchart of a method for search request processing provided by an embodiment of the present disclosure.

Based on the above embodiments, referring to FIG. 4, an embodiment of the present disclosure provides a flowchart of a method for search request processing. The method includes the following steps 401 to 404.

In 401, a search request with a target question sent from a client is received, the target question corresponding to a plurality of answers.

In 402, the search result corresponding to the search request and the attribute feature of the target question are determined.

In 403, for each search result, after initial structured information is extracted from the search result, the initial structured information is aggregated based on a target aggregation approach corresponding to attribute feature of the target question, and a plurality of pieces of structured information is determined, wherein each piece of the structured information includes an argument and/or a premises of an answer and core content of the answer.

In 404, the plurality of pieces of structured information is sent to the client so as to present the structured information through the client.

The steps 401 to 404 present the method for search request processing for the target question on a server side after receiving the search request carrying the target question sent by the client.

With respect to 402:
after receiving the user's question, the server preferentially determines a plurality of candidate search results based on the search request of the target question, and then determines the search results corresponding to the search request based on preset authority scores of the plurality of candidate search results and the degree of relevance between the candidate search results and the target question.

With respect to 403:
in a possible implementation, the structured information extraction model is preferentially applied to extract initial structured information from the search results for each search result based on an intent or a sentence type. Then, the initial structured information is aggregated based on a voting model to determine a plurality of pieces of structured information.

It is understandable for those skilled in the art that in the above method of specific implementations, an order in which the steps are written does not imply a strict order of execution which constitutes any limitation on the process of implementation, and that the specific order of execution of the steps shall be determined by its function and possible internal logic.

Based on the same invention idea, an embodiment of the present disclosure further provides an apparatus for search result presentation corresponding to the method for search result presentation. Since the principle of solving the problem by the apparatus in the embodiment of the present disclosure is similar to the method for search result presentation in the above embodiment of the present disclosure. Therefore, the implementation of the apparatus may be referred to the implementation of the method, and the repetition will not be described again.

Figure 5:
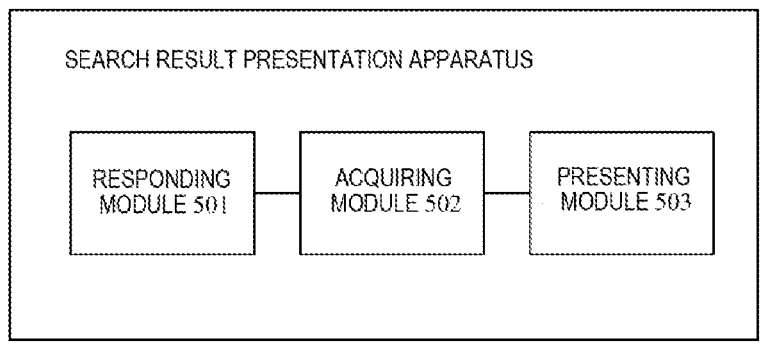
FIG. 5 illustrates a schematic diagram of an apparatus for search result presentation provided by an embodiment of the present disclosure.

As is shown in FIG. 5, a schematic architecture diagram of an apparatus for search result presentation provided by an embodiment of the present disclosure is illustrated. The apparatus includes a responding module 501, an acquiring module 502, and a presenting module 503.

The responding module 501 is configured to initiate a search request for a target question in response to a trigger operation, the target question corresponding to a plurality of answers.

The acquiring module 502 is configured to acquire a plurality of pieces of structured information that represents the respective answers, wherein the structured information is obtained by extracting from search results that support the answers and aggregating according to a target aggregation approach corresponding to an attribute feature of the target question, the search results are multimedia content recalled on the basis of the target question, and each piece of structured information includes an argument and/or a premise of an answer and core content of the answer.

The presenting module 503 is configured to present the plurality of pieces of the structured information on a search result page.

In an optional implementation, the structured information is obtained by extracting initial structured information from the search results and then aggregating the initial structured information according to the target aggregation approach corresponding to the attribute feature of the target question.

After a plurality of candidate search results is determined based on the search request, the search results are filtered based on preset authority scores of the plurality of candidate search results and the degree of relevance between the plurality of candidate search results and the target question.

In an optional implementation, the attribute feature of the target question includes a first type in which the answer is related to the premise or a second type in which the answer is not related to the premise.

In the case where the attribute feature of the target question is of the first type, each piece of the structured information at least includes core content and premise of the answer.

In the case where the attribute feature of the target question is of the second type, each piece of the structured information at least includes core content and argument of the answer.

In an optional implementation, the initial structured information is extracted from the search results based on a pre-trained structured information extraction model.

The aggregating the initial structured information according to the target aggregation approach corresponding to the attribute feature of the target question includes:
  in the case where the attribute feature of the target question is of the first type, aggregating the initial structured information based on the premise in the structured information; and
  in the case where the attribute feature of the target question is of the second type, aggregating the initial structured information based on the core content of the answer in the structured information.

In an optional implementation, the presenting module 503 is, while presenting a plurality of pieces of the structured information on a search result page, configured to:
  construct answer information corresponding to the structured information to answer the target question, based on each piece of the structured information; and
  present answer information for the plurality of pieces of the structured information side by side on the search result page.

In an optional implementation, the presenting module 503 is, while presenting the plurality of pieces of the structured information on the search result page, configured to:
  present the plurality of pieces of the structured information on the search result page, and search results corresponding to the structured information.

In an optional implementation, the presenting module 503 is, while presenting the plurality of pieces of the structured information on the search result page and search results corresponding to the structured information, configured to:
  present the core content of the answers in the plurality of pieces of the structured information on the search result page, and present a content card of the selected core content. The content card presents a part of the multimedia content of the search results, and the content card supports a sliding presentation Based on the same invention concept, an embodiment of the present disclosure further provides an apparatus for search request processing corresponding to the method for search request processing. Since the principle of solving the problem by the apparatus in the embodiment of the present disclosure is similar to the method for search request processing in the above embodiment of the present disclosure, the implementation of the apparatus may be referred to the implementation of the method, and the repetition will not be described again.

Figure 6:
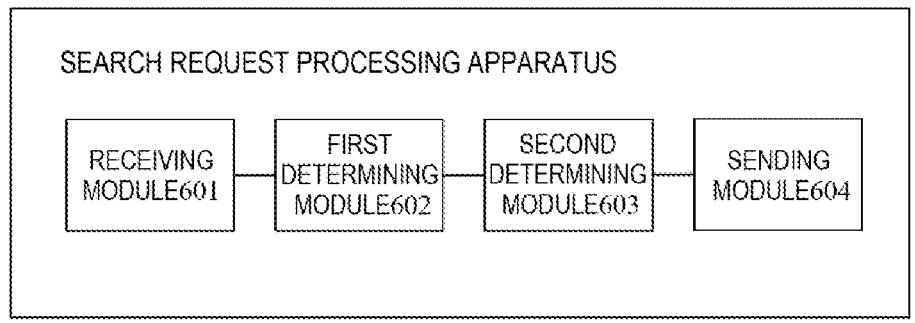
FIG. 6 illustrates a schematic diagram of an apparatus for search request processing provided by an embodiment of the present disclosure.

Referring to FIG. 6, a schematic architecture diagram of an apparatus for search request processing provided by an embodiment of the present invention is illustrated. The apparatus includes a receiving module 601, a first determining module 602, a second determining module 603, and a sending module 604.

The receiving module 601 is configured to receive a search request carrying a target question sent from a client, the target question corresponding to a plurality of answers.

The first determining module 602 is configured to determine the search result corresponding to the search request and determine an attribute feature of the target question.

The second determining module 603 is configured to, for each search result, after extract initial structured information from the search result, then aggregate the initial structured information based on a target aggregation approach corresponding to the attribute feature of the target question, and determine a plurality of pieces of structured information, wherein each piece of the structured information includes an argument and/or a premise of an answer and core content of the answer.

The sending module 604 is configured to send the plurality of pieces of structured information to the client so as to present the structured information through the client.

The description of the processing flow of each module in the apparatus and the interaction flow between the respective modules may refer to the relevant description in the above method embodiments, and will not be detailed here.

Figure 7:
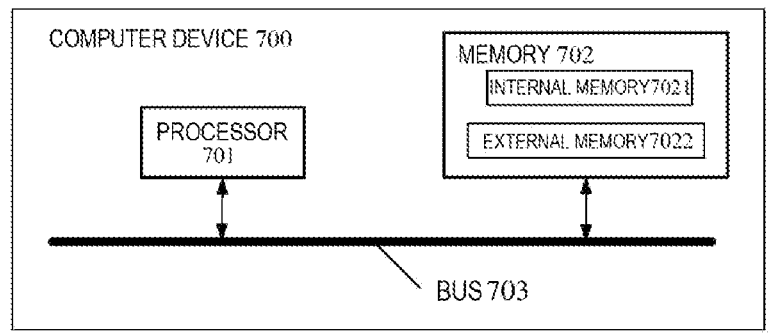
FIG. 7 illustrates a schematic structural diagram of a computer device provided by an embodiment of the present disclosure.

Based on the same technical concept, an embodiment of the present disclosure further provides a computer device. Referring to FIG. 7, a schematic structural diagram of a computer device 700 provided by an embodiment of the present disclosure is provided. The computer device 700 includes a processor 701, a memory 702 and a bus 703. The memory 702 is configured to store execution instructions and includes an internal memory 7021 and an external memory 7022. The internal memory 7021 is configured to temporarily store operational data in the processor 701 and data exchanged with the external memory 7022 such as a hard disk. The processor 701 exchanges data with the external memory 7022 through the internal memory 7021. When the computer device 700 is running, the processor 701 communicates with the memory 702 via the bus 703, causing the processor 701 to execute the following instructions:
  in response to a trigger operation, initiating a search request for a target question, the target question corresponding to a plurality of answers;
  acquiring a plurality of pieces of structured information characterizing the respective answers, wherein the structured information is obtained by extracting from search results that support the respective answers and aggregating according to a target aggregation approach corresponding to an attribute feature of the target question, the search results are multimedia contents recalled on the basis of the target question, and each piece of the structured information includes an argument and/or a premise of an answer, and core content of the answer; and
  presenting the plurality of pieces of the structured information on a search result page.

In a possible implementation, in the instructions executed by the processor 701, the structured information is obtained by extracting initial structured information from the search results and then aggregating the initial structured information according to the target aggregation approach corresponding to the attribute feature of the target question.

After a plurality of candidate search results is determined based on the search requests, the search results are filtered based on preset authority scores of the plurality of candidate search results and the degree of relevance between the plurality of candidate search results and the target question.

In a possible implementation, in the instructions executed by the processor 701, the attribute feature of the target question includes a first type in which the answer is related to the premise or a second type in which the answer is not related to the premise.

In the case where the attribute feature of the target question is of the first type, each piece of the structured information at least includes core content and premise of the answer.

In the case where the attribute feature of the target question is of the second type, each piece of the structured information at least includes core content and argument of the answer.

In a possible implementation, in the instructions executed by the processor 701, the initial structured information is extracted from the search results based on a pre-trained structured information extraction model.

The aggregating the initial structured information according to the target aggregation approach corresponding to the attribute feature of the target question includes:
  in the case where the attribute feature of the target question is of the first type, aggregating the initial structured information based on the premise in the structured information; and
  in the case where the attribute feature of the target question is of the second type, aggregating the initial structured information based on the core content of the answer in the structured information.

In a possible implementation, in the instructions executed by the processor 701, the presenting the plurality of pieces of the structured information on the search result page includes:
  constructing answer information corresponding to the structured information to answer the target question, based on each piece of the structured information; and
  presenting answer information for a plurality of pieces of the structured information side by side on the search result page.

In a possible implementation, in the instructions executed by the processor 701, the presenting the plurality of the structured information on the search result page includes:
  presenting the plurality of pieces of the structured information on the search result page, and search results corresponding to the structured information.

In a possible implementation, in the instructions executed by the processor 701, the presenting the plurality of pieces of the structured information on the search result page and the search results corresponding to the structured information includes:
  presenting the core content of the answers in the plurality of pieces of the structured information on the search result page, and presenting a content card of the selected core content, the content card presenting a part of the multimedia content of the search results, the content card supporting a sliding presentation.

Alternatively, the processor 701 may also execute the following instructions:
  receiving a search request carrying a target question sent from a client, the target question corresponding to a plurality of answers;
  determining a search result corresponding to the search request, and determining an attribute feature of the target question;
  for each search result, after extracting initial structured information from the search result, aggregating the initial structured information based on a target aggregation approach corresponding to the attribute feature of the target question, and determining a plurality of pieces of structured information, wherein each piece of structured information includes an argument and/or a premise of an answer and core content of the answer; and
  sending the plurality of pieces of structured information to the client so as to present the structured information through the client.

An embodiment of the present disclosure further provides a computer readable storage medium configured to store a computer program therein. The computer program is run by a processor to execute the steps of the method for search result presentation and the steps of the method for search request processing described in the method embodiments. The storage medium may be a volatile or non-volatile computer readable storage medium.

An embodiment of the present disclosure further provides a computer program product, wherein the computer product carries program codes. The program codes include instructions that may be configured to perform the steps of the method for search result presentation and the method for search request processing described in the above method embodiments. Details may refer to the above method embodiments of the method and will not be repeated here.

The above computer program product may be implemented specifically through hardware, software or a combination of them. In an optional embodiment, the computer program product is embodied as a computer storage medium; and in another optional embodiment, the computer program product is embodied as a software product, such as a software development kit (SDK).

An embodiment of the present disclosure further provides a computer program that, when executed by a processor, may be used to implement the steps of the method for search result presentation and the steps of the method for search request processing described in the above method embodiments, which may specifically refer to the above method embodiments and will not be repeated here.

Those skilled in the art can clearly understand that, for the convenience and conciseness of description, the specific working process of the system and apparatus described above may refer to the corresponding process in the foregoing method embodiments, and will not be repeated here. In the several embodiments provided by the present disclosure, it should be understood that the disclosed system, apparatus and method may be implemented by other means. The apparatus embodiments described above are only schematic. For example, the partitioning of the units is only a logical function partitioning. There may be other partitioning modes during actual implementation. For another example, a plurality of units or components can be combined or integrated into another system, or some features can be ignored or not executed. In addition, the coupling or direct coupling or communication connection that is shown or discussed may be an indirect coupling or communication connection through some communication interfaces, apparatuses or units, and may be electrical, mechanical or other forms.

The units described as separate components may or may not be physically separated, and the components presented as units may or may not be physical units, that is, may be located in one place, or may be distributed to multiple network units. Some or all of the units can be selected according to the actual needs to achieve the objects of the solutions of the embodiments.

In addition, the functional units in various embodiments of the present disclosure may be integrated in a single processing unit. Or, the units may exist physically separately, or two or more units may be integrated in a single unit.

The functions, if implemented in the form of a software functional unit and sold or used as a stand-alone product, may be stored in a non-volatile computer readable storage medium that may be executed by a processor. Based on this understanding, the technical solution of the present disclosure in essence (or parts that contribute to the prior art or parts of this technical solution) may be embodied in the form of a software product. This computer software product is stored in a storage medium and includes a plurality of instructions for causing a computer device (which may be a personal computer, server, or network device, etc.) to perform all or part of the steps of the method described in various embodiments of the present disclosure. The aforementioned storage media includes: a U disk, a portable hard disk, a read-only memory (ROM), a random access memory (RAM), a magnetic disk or an optical disc and other media that can store program codes therein.

Finally, it should be noted that the above embodiments are only specific implementations of the present disclosure, which are used to illustrate the technical solutions of the present disclosure, and are not intended to limit the technical solution of the present disclosure. Therefore, the protection scope of the present disclosure is not limited to this. Although the detailed description is made to the present disclosure by reference to the foregoing embodiments, those of ordinary skills in the art shall understand that, within the technical scope disclosed herein, any skilled person who is familiar with the technical field can still modify or easily think of changes to the technical solution recorded in the foregoing embodiments, or make equivalent replacements for some of the technical features. Such modifications, changes or replacements shall not make the essence of the corresponding technical solutions depart from the spirit and scope of the technical solutions of the various embodiments of the present discourse, and shall be covered by the protection scope of the present disclosure. Therefore, the protection scope of the present disclosure should be subject to the appended claims.

We claim:

1. A method for search result presentation, comprising:
in response to a trigger operation, initiating a search request for a target question, the target question corresponding to a plurality of answers;
acquiring a plurality of pieces of structured information characterizing the respective answers, wherein the structured information is obtained by extracting initial structured information from search results that support the respective answers and aggregating the initial structured information according to a target aggregation approach corresponding to an attribute feature of the target question, the search results are multimedia contents recalled based on the target question, and each piece of structured information comprises an argument and/or a premise of an answer and core content of an answer; the attribute feature of the target question comprises a first type in which the answer is related to the premise or a second type in which the answer is not related to the premise; in the case where the attribute feature of the target question is of the first type, aggregating the initial structured information based on the premise in the structured information; and in the case where the attribute feature of the target question is of the second type, aggregating the initial structured information based on the core content in the structured information; and
presenting the plurality of pieces of the structured information on a search result page.

2. The method of claim 1, wherein the structured information is obtained by extracting initial structured information from the search results and then aggregating the initial structured information according to the target aggregation approach corresponding to the attribute feature of the target question,
wherein after a plurality of candidate search results is determined based on the search request, the search results are filtered based on preset authority scores of the plurality of candidate search results and the degree of relevance between the plurality of candidate search results and the target question.

3. The method of claim 1, wherein
in the case where the attribute feature of the target question is of the first type, each piece of the structured information at least includes core content and premise of the answer; and
in the case where the attribute feature of the target question is of the second type, each piece of the structured information at least includes core content and argument of the answer.

4. The method of claim 2, wherein the initial structured information is extracted from the search results based on a pre-trained structured information extraction model.

5. The method of claim 1, wherein the presenting the plurality of pieces of the structured information on the search result page comprises:
constructing answer information corresponding to the structured information to answer the target question, based on each piece of the structured information; and
presenting answer information for the plurality of pieces of the structured information side by side on the search result page.

6. The method of claim 1, wherein the presenting answer information for the plurality of the structured information on the search result page comprises:
presenting the plurality of pieces of the structured information on the search result page, and search results corresponding to the structured information.

7. The method of claim 6, wherein the presenting the plurality of pieces of the structured information on the search result page and search results corresponding to the structured information comprises:
presenting the core content of the answer in the plurality of pieces of the structured information on the search result page, and presenting a content card of the core content, the content card presenting a part of the multimedia content of the search results, the content card supporting a sliding presentation.

8. A method for search request processing, comprising:
receiving a search request carrying a target question sent from a client, the target question corresponding to a plurality of answers;
determining a search result corresponding to the search request, and determining an attribute feature of the target question, wherein the attribute feature of the target question comprises a first type in which the answer is related to the premise or a second type in which the answer is not related to the premise;
for each search result, after extracting initial structured information from the search result, aggregating the initial structured information based on a target aggregation approach corresponding to the attribute feature of the target question, and determining a plurality of pieces of structured information, wherein each piece of the structured information comprises an argument and/or a premise of an answer and core content of an answer, in the case where the attribute feature of the target question is of the first type, aggregating the initial structured information based on the premise in the structured information; and in the case where the attribute feature of the target question is of the second type, aggregating the initial structured information based on the core content in the structured information; and sending the plurality of pieces of structured information to the client so as to present the structured information through the client.

9. A computer device, comprising: a processor, a memory and a bus, wherein the memory is configured to store machine-readable instructions that can be executed by the processor; and when the computer device is running, the processor communicates with the memory through the bus, and the machine-readable instructions are executed by the processor to perform the steps of a method for search result presentation, the method comprising:

in response to a trigger operation, initiating a search request for a target question, the target question corresponding to a plurality of answers;

acquiring a plurality of pieces of structured information characterizing the respective answers, wherein the structured information is obtained by extracting initial structured information from search results that support the respective answers and aggregating the initial structured information according to a target aggregation approach corresponding to an attribute feature of the target question, the search results are multimedia contents recalled based on the target question, and each piece of structured information comprises an argument and/or a premise of an answer and core content of an answer, the attribute feature of the target question comprises a first type in which the answer is related to the premise or a second type in which the answer is not related to the premise; in the case where the attribute feature of the target question is of the first type, aggregating the initial structured information based on the premise in the structured information; and in the case where the attribute feature of the target question is of the second type, aggregating the initial structured information based on the core content in the structured information; and presenting the plurality of pieces of structured information on a search result page.

10. The computer device of claim 9, wherein the structured information is obtained by extracting initial structured information from the search results and then aggregating the initial structured information according to the target aggregation approach corresponding to the attribute feature of the target question, wherein after a plurality of candidate search results is determined based on the search request, the search results are filtered based on preset authority scores of the plurality of candidate search results and the degree of relevance between the plurality of candidate search results and the target question.

11. The computer device of claim 9, wherein in the case where the attribute feature of the target question is of the first type, each piece of the structured information at least includes core content and premise of the answer; and in the case where the attribute feature of the target question is of the second type, each piece of the structured information at least includes core content and argument of the answer.

12. The computer device of claim 10, wherein the initial structured information is extracted from the search results based on a pre-trained structured information extraction model.

13. The computer device of claim 9, wherein the presenting the plurality of pieces of the structured information on the search result page comprises:

constructing answer information corresponding to the structured information to answer the target question, based on each piece of the structured information; and presenting answer information for the plurality of pieces of the structured information side by side on the search result page.

14. The computer device of claim 9, wherein the presenting answer information for the plurality of the structured information on the search result page comprises:

presenting the plurality of pieces of the structured information on the search result page, and search results corresponding to the structured information.

15. The computer device of claim 14, wherein the presenting the plurality of pieces of the structured information on the search result page and search results corresponding to the structured information comprises:

presenting the core content of the answer in the plurality of pieces of the structured information on the search result page, and presenting a content card of the selected core content, the content card presenting a part of the multimedia content of the search results, the content card supporting a sliding presentation.

* * * * *